United States Patent [19]

Dias

[11] Patent Number: 5,035,019

[45] Date of Patent: Jul. 30, 1991

[54] COLD-FORMING TAP

[75] Inventor: Maureen E. Dias, North Attleborough, Mass.

[73] Assignee: North Attleboro Taps, Inc., Mass.

[21] Appl. No.: 536,416

[22] Filed: Jun. 11, 1990

Related U.S. Application Data

[63] Continuation of Ser. No. 419,767, Oct. 11, 1989, abandoned, which is a continuation of Ser. No. 201,770, Jun. 2, 1988, abandoned, which is a continuation of Ser. No. 865,892, May 21, 1986, abandoned.

[51] Int. Cl.$^5$ ............................................... B23G 7/02
[52] U.S. Cl. ................................................... 10/152 T
[58] Field of Search ............. 10/141 R, 152 R, 152 T; 408/217, 219, 227, 228, 229; 411/386, 387, 416, 417

[56] References Cited

U.S. PATENT DOCUMENTS 1,912,517  6/1933  Lapotterie .......................... 10/152 T
3,775,792 12/1973  Leonard ............................. 10/152 T Primary Examiner—E. Michael Combs
Attorney, Agent, or Firm—William Nitkin

[57] ABSTRACT

A cold-forming tap is disclosed with a triangular-shaped body when viewed on end with concentric threads cut into the corners of the triangular-shaped body.

1 Claim, 1 Drawing Sheet

COLD-FORMING TAP

CROSS REFERENCE TO RELATED APPLICATIONS

This application is a continuation of prior application Ser. No. 419,767 filed Oct. 11, 1989 of the same title, now abandoned which was a continuation of application Ser. No. 201,770 filed Jun. 2, 1988, now abandoned of the same title which was a continuation of application Ser. No. 865,892 filed May 21, 1986 now abandoned of the same title.

BACKGROUND OF THE INVENTION

1. Field of the Invention

The device of this invention is a tap and more particularly relates to an improved design of a cold-forming tap.

2. Description of the Prior Art

Conventional cold-forming taps are well known in the art. They normally are circular in shape with radially ground lobes. In order to manufacture them, these lobes must be ground into hardened, high-speed steel. To manufacture conventional thread-forming taps, a cam-relieving method is used whereby the tap blank is rotated between holding centers on a thread grinder while a grinding wheel shaped to the desired thread form is plunged symetrically toward and away from the axis of the blank by a cam action. This movement results in the formation of high points or lobes running parallel to the axis of the tap which are commonly referred to as forming lobes. To manufacture such lobes requires slow grinding speeds and multiple passes to prevent overheating of the tap blank during the part of the grinding cycle that plunges the grinding wheel toward the axis of the tap. After the thread form is ground in the tap blank, a secondary operation to grind the outer diameter of the lobe to conform to the thread shape must be performed. This secondary grinding operation is done at the crest of the thread form which requires very careful alignment and again must be performed by a cam relieving action of the thread grinder. The entire process of producing the traditional cold-forming taps requires that only about 60-70 of such lobes can be ground per hour. Due to the mechanical linkages of the cam action, very careful work must be performed to form the lobes. Because of such mechanical linkages involved in the cam action of the thread grinder and the movements of the grinding wheel in relation to the tap itself, the production rate of actual taps can be as low as 20-25 taps per hour per operator.

Conventional cold-forming taps, when utilized, undergo tremendous stress so that any weakness in the tap causes immediate failure and since fluted taps are weaker than solid taps, they have a higher incidence of breakage although they are faster to use since the fluted taps allow room for lubrication while solid taps do not. Also because of the design of the fluted lobes of the tap, they must move a great deal of material across the forming surface as the tap rotates and thus a great deal of torque is required to drive the tap. A further problem that arises in the prior art is galling where the tap at some point welds to the material being tapped. The result can be tool breakage, oversized threads and poor finish which results occur in the prior art where there is a lack of lubrication, when the temperature of the workpiece has become elevated beyond a desired level or in situations where there is a large area of workpiece-tool engagement. Further, conventional cold-forming taps allow the workpiece material to close in around the tap giving a tight fit and under many conditions where tight gauging is necessary, serious problems can occur when production runs are made. In some situations it is necessary to gauge every piece and sort by hand to determine the tap size to be used in cases of contraction problems caused by using an over-sized conventional tap which stretches or expands the workpiece thereby allowing for the contraction of the workpiece material after the tap is removed. A further disadvantage of the prior art cold-forming taps is that when worn down, they cannot be reused into any other product.

SUMMARY OF THE INVENTION

It is an object of this invention to provide an improved cold-forming tap of unique design and method of manufacture. The cold-forming taps of this invention can be thread-ground on conventional thread-grinding equipment without the need or use of extensive cam-relieving action. The thread form of this invention is ground concentric with the tap axis and is accomplished by creating the lobe configuration on the tap blank prior to the thread-grinding as will be described further below. Since the forming lobe configuration exists already on the blank, the grinding wheel producing the thread form is not required to plunge toward the tap axis and far less stock is removed at a much higher rate during the grinding process than is removed in the production of conventional taps.

It is a further object of this invention that the improved taps of this design can be produced without overheating and burning of the high-speed steel at approximately double the production rate of taps of the prior art. Further it is not necessary in the production of taps of this invention to use secondary grinding operations of the outer or major diameter of the lobes since that step is unnecessary because the preformation of the lobes eliminates the surface area that is ground away in the prior art conventional forming taps. The lobes of this invention are formed by creating a portion of the tap in a triangular form which process eliminates radially grounded flutes. Such lobes are easy to form accurately on a hardened blank at a rate of about 150-200 triangular blanks per hour. This production rate creates a considerable savings in manufacturing costs. The pitch diameter of the tap of this invention can be ground concentrically which grinding also increases the speed of production to about 50-55 per hour. In effect the production rate of taps of this invention can increased almost 60% over the production rate of taps of the prior art and the taps of this invention can be produced at lower costs which will have significant advantages in actual use. The tap of this invention, having a triangular shape, increases the core diameter of the tool by about 10% over use of conventionally fluted cold-forming taps and although the tap of this invention might not be as strong as a solid tap, it adds considerable strength and allows for significantly easier lubrication than a strictly solid tap. The sides of the triangular form create excellent channels for oil or other cutting fluid to reach the forming teeth of the tap and the lubrication can reach the forming teeth by using the centrifugal force created by the tap's rotation. The use of the flutes of this tap to enhance lubrication flow cannot be accomplished with the standard prior art taps. Further the amount of torque necessary to drive the taps of this invention is less than that required by conventional taps. Since the amount of surface area on the ends of the lobes at the edges of the angles of the triangle is approximately half of that of the conventional tap, less torque is required to drive the tool. The reduction in surface area also serves a further purpose in that it reduces the friction which in turn reduces by a significant amount the heat produced while tapping with the tap of this invention. Heat causes the breakdown of high-speed steel at a very quick rate and thus the reduction of heat is a significant advantage of the device of this invention and allows the taps of this invention to be used in exotic alloys where heat can be a problem in forming threads therein. Further, the galling problems found in the prior art are avoided by extensive lubrication in the channels and the small surface area actually forming the threads minimizes the workpiece tool-engagement points and reduces the generation of any undesirable excess heat. An additional advantage of the tap of this invention is that its use avoids the problem of the workpiece closing in around the tap or contracting after the threads have been cut therein since the small area of surface engagement of the device of this invention with the work piece does not cause stretching or expansion of the workpiece as conventional cold-forming taps do. Therefore the tap of this invention has improved sizing characteristics which are highly desirable. An additional advantage of the cold-forming tap of this invention is that it can be renewed to its original condition by using a surface grinder to remove worn portions of the lobe.

DESCRIPTION OF THE PREFERRED EMBODIMENT(S)

Figure 1:
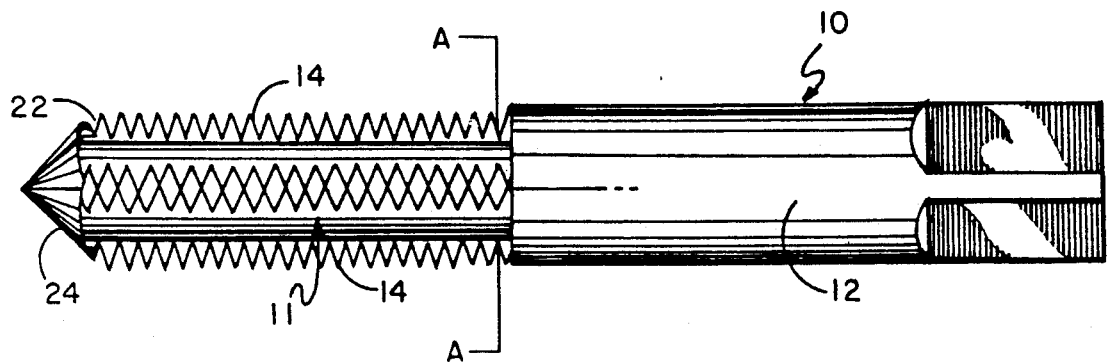
FIG. 1 illustrates a side view of the tool of this invention.
Figure 2:
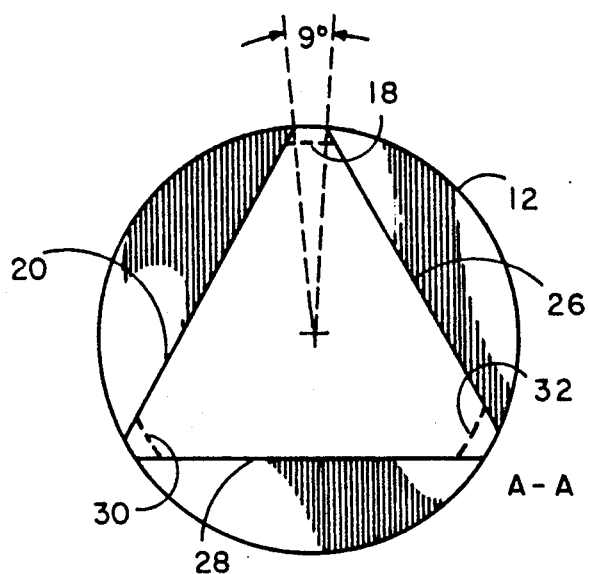
FIG. 2 illustrates an enlarged end view through section A—A of FIG. 1.

FIG. 1 illustrates a side view of the device 10 of this invention with traditional shank portion 12. Seen extending therefrom is tap portion 11 with threads 14 cut therein. In this view two sides of the triangular form are seen with the tap tapers becoming smaller at their tapered end 22 and forming a point 24. Before grinding the threads, the tool is ground as seen in FIG. 2 into a triangular form on the tap blank with sides 20, 26 and 28. The tool is then ground on conventional thread-grinding equipment with concentric threads 18, 30 and 32 ground concentric with the tap axis to form lobes 14 on the tap blank itself without the need, as in the prior art, to specifically and specially grind such lobes separately. The lobes are characterized by narrow lands having approximately 9 degree width of lobe arc in contact with the workpiece. When the grinding wheel grinds threads 18, 30 and 32 into the blank, the blank rotates in front of the grinding wheel so that the threads are formed concentrically to the shape of the shank portion and they are not specially ground out as is necessary in the prior art. Therefore very little stock is actually being removed during the grinding operation.

Although the present invention has been described with reference to particular embodiments, it will be apparent to those skilled in the art that variations and modifications can be substituted therefor without departing from the principles and spirit of the invention.

I claim:

1. An improved cold-forming tap for forming threads in a workpiece, comprising:
    a triangular-shaped tap body having a forward end with tapered threads, said tap body having three flat sides and three adjoining corners, each of said corners having an outer edge, said body having a central axis; and
    a plurality of concentric threads formed in each of said outer edges of said corners of said triangular-shaped tap body, each of said threads being concentric to the central axis of said tap body and being formed on a radius from said tap's central axis, such threads defining a plurality of lobes at each of said corners of said triangular-shaped tap body, said lobes being configured without any radial relief and having a smaller area of surface engagement than tap lobes embodying radial relief, each of said lobes further defining a plurality of longitudinally-extending narrow lands, each land having a lobe arc width of approximately 9 degrees for contacting and cold forming said threads in said workpiece.

* * * * *

UNITED STATES PATENT AND TRADEMARK OFFICE
CERTIFICATE OF CORRECTION

PATENT NO. : 5,035,019

DATED : July 30, 1991

INVENTOR(S) : Maureen E. Dias

It is certified that error appears in the above-identified patent and that said Letters Patent is hereby corrected as shown below:

On the title page:
Delete "Maureen E. Dias" as Inventor and substitute therefor
--Stephen P. Dias, deceased, by Maureen E. Dias, Executrix--

Signed and Sealed this

Seventeenth Day of November, 1992

Attest:

DOUGLAS B. COMER

Attesting Officer

Acting Commissioner of Patents and Trademarks